United States Patent
Gallery et al.

(10) Patent No.: US 6,643,495 B1
(45) Date of Patent: Nov. 4, 2003

(54) COMMUNICATION SYSTEM AND DEVICE FOR USE WITH BOTH A BROADBAND DISTRIBUTION NETWORK AND A TELEPHONE NETWORK

(75) Inventors: Richard David Gallery, Dublin (IE); Henricus Joseph Cornelus Kuijpers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 491 days.

(21) Appl. No.: 09/621,529

(22) Filed: Jul. 21, 2000

(30) Foreign Application Priority Data

Jul. 21, 1999 (EP) .............................. 99202394

(51) Int. Cl.[7] .............................................. H04H 7/00
(52) U.S. Cl. ...................... 455/3.06; 455/414; 725/66; 725/122; 725/68; 725/109
(58) Field of Search ................ 455/3.06, 414, 455/344, 462, 426, 74.1, 66; 348/14.02, 14.04; 725/109, 122, 66, 68, 70, 62, 73

(56) References Cited

U.S. PATENT DOCUMENTS 5,635,980 A    6/1997   Lin et al. ........................ 348/13
6,172,673 B1 *  1/2001   Lehtinen et al. ............ 345/716
6,175,861 B1 *  1/2001   Williams, Jr. et al. ...... 709/217
6,424,646 B1 *  7/2002   Gerszberg et al. .......... 370/352

* cited by examiner

Primary Examiner—Nay Maung
Assistant Examiner—Edan Orgad
(74) Attorney, Agent, or Firm—Daniel J. Piotrowski

(57) ABSTRACT

In a communication system a communication device (2) is present for receiving a wideband broadcast signal from a head-end. For providing a return channel to enable interactive TV services, a GSM transceiver (34) is included in the communication device.

In order to be able to provide also telephone services access control means (30) are present in the communication device (2) in order to control the access to the GSM transceiver without access conflicts causing an incorrect working system. The access control means switch between the return signals transmitted by a processor (12) and the telephone signals transmitted by a telephone terminal (22).

In an embodiment of the invention, the communication device (2) is integrated in a TV set (3).

11 Claims, 3 Drawing Sheets

COMMUNICATION SYSTEM AND DEVICE FOR USE WITH BOTH A BROADBAND DISTRIBUTION NETWORK AND A TELEPHONE NETWORK

BACKGROUND OF THE INVENTION

The present invention relates to a communication system comprising a broadband distribution network coupled to a first port of a communication device, and a telephone network coupled to a second port of the communication device, the communication device comprises control signal transmitting means for transmitting control message related to signals received from the broadband distribution network via the telephone network.

The present invention also relates to a communication device and a TV receiver comprising such a communication device.

A communication system according to the preamble is known from EN 301 195, "Digital Video Broadcasting (DVB); Interaction channel through the global system for mobile communication.

Presently, in various countries digital TV systems are deployed, mainly based on the DVB (Digital Video Broadcast) or the ATSC (Advanced Television Systems Committee) standards. Both standards provide the possibility to introduce interactive services. Such interactive services can include, but are not limited to, Video on demand, pay per view, home shopping and playing games. In order to be able to introduce these interactive services, it is needed that the communication device can transmit control messages to a server via a return channel. In the above standard it is proposed to use a telephone network such as the GSM network for the return channel.

SUMMARY OF THE INVENTION

The problem with the above communication network is that only the interactive services as defined in said standard can be provided. The object of the present invention is to provide a communication system according to the preamble in which additional services can be provided.

To achieve the above object, the present invention is characterized in that the communication system comprises access control means being arranged for controlling access to the telephone network by the control signal transmitting means and at least one telephone terminal.

By introducing the access control means to control access to the telephone network, it becomes possible to provide additional POTS services without needing an connection to an additional telephone network. The access control means prevent that access conflicts occur when the telephone network simultaneously has to be used for transmitting control signals and for transmitting telephone signals.

An embodiment of the invention is characterized in that the communication device comprises the access control means.

By integrating the access control means in the communication device, a single device is obtained to which all telephone terminals can be connected.

An embodiment of the present invention is characterized in that the access control means comprise conversion means which are arranged for converting telephone signals from the telephone network into telephone signals for the telephone terminal, and for converting telephone signals from the telephone terminal into telephone signals for the telephone network.

By introducing the conversion means, it becomes possible to use telephone terminals different than those to be used with the telephone network. This makes it possible that common wired telephone terminals are used where the telephone network is a mobile radio network such as GSM. This is in particular suitable for introducing interactive broadband services and telephony services in areas where no adequate communication infrastructure is available.

An alternative embodiment of the present invention is characterized in that the at least one telephone terminal comprises a cordless terminal, and in that the communication system comprises a basestation for cordless terminals.

This enables the use of cordless phones in the communication system according to the invention.

A still further embodiment of the invention is characterized in that characterized in that the communication network comprises a TV receiver coupled to the communication device, and in that the TV receiver comprises the at least one telephone terminal. By integrating the telephone terminal into a TV receiver, it becomes possible to provide one single device for telephone and advanced broadcast services. It is also possible to integrate the communication device and the telephone terminal in a TV set. This gives a complete integration of the telephone and TV functions.

BRIEF DESCRIPTION OF THE DRAWINGS

The present invention will now be explained with reference to the drawings.

DETAILED DESCRIPTION OF THE INVENTION

Figure 1:
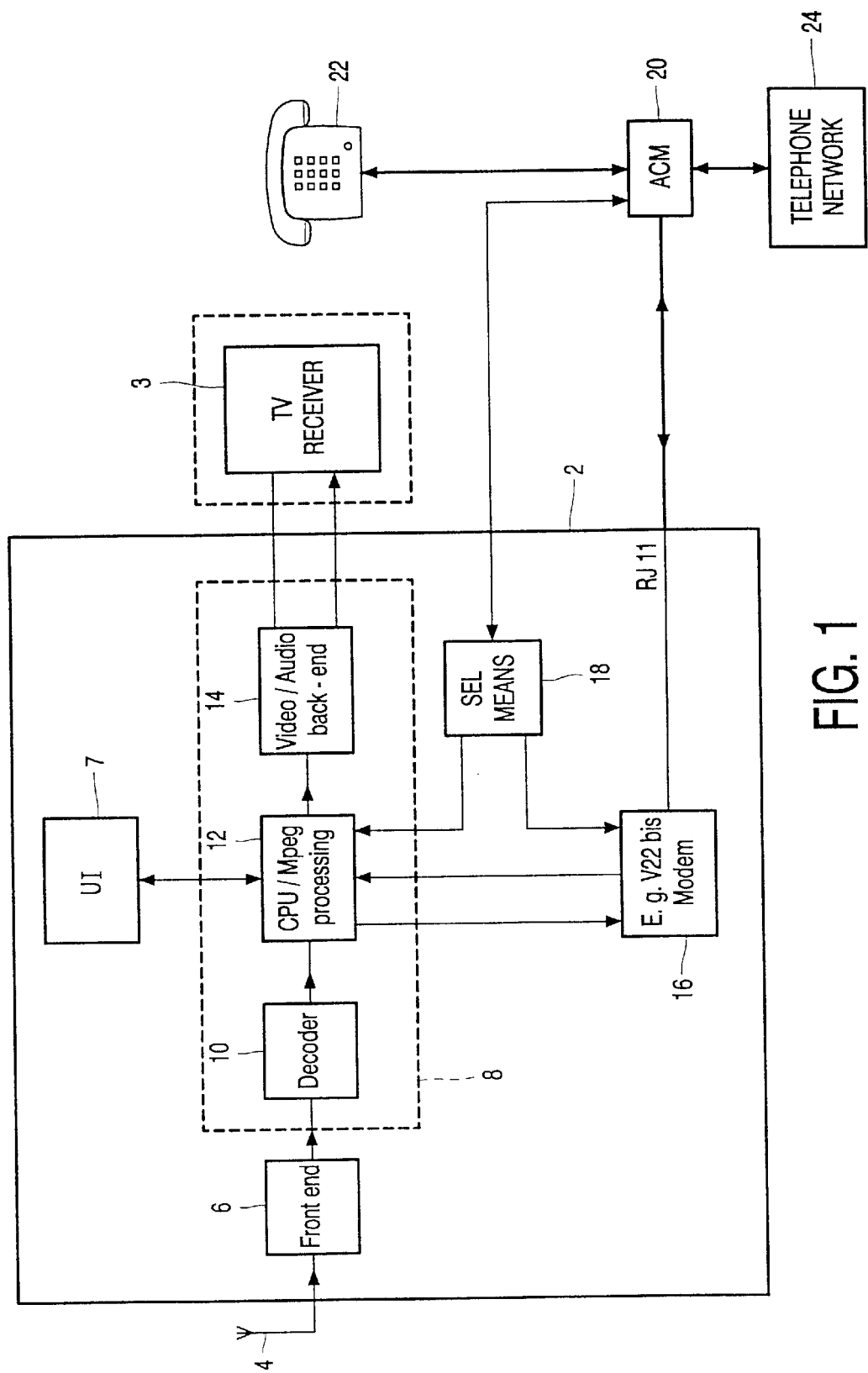
FIG. 1 shows a first embodiment of the invention in which the telephone network is a wired telephone network.

In the communication system according to FIG. 1, the first port of the communication device 2 is connected to a broadband distribution network via an antenna 4. This communication device can be a set-top box to be used with a TV receiver 3. Alternatively, it is also possible that the communication device is integrated in the TV receiver 3. In this case the distribution network is a terrestrial or satellite channel such as DVB-T or DVB-S. Alternatively, the broadband distribution network can also be a CATV distribution network.

The first port of the communication device 2 is connected to an input of a front end 6. An output of the front end 6 is connected to an input of a channel decoder 10 which derives a stream of (error corrected) digital symbols from the output signal of the front-end 6. The output signal of the decoder 10 can e.g. be an MPEG-2 transport stream.

The output of the decoder 10 is connected to a processor 12. In the case that an MPEG-2 signal is used, the processor 12 is arranged for extracting and decoding the video signal carried by the MPEG-2 transport stream. The processor 12 is also arranged for extracting control information from the MPEG-2 transport stream and for reading commands entered by a user on a user interface 7.

The decoded audio and video signals from the communication device 2 are supplied to a TV receiver 3 for playback. In interactive TV systems it is common that signals from the set-top box 2 have to be transmitted to a head-end in order to control the signals to be received from the broadband distribution network. Such control signals can include signals for selecting a particular TV program from a video on demand service or for transmitting time stamps to the head-end in case of impulse pay per view systems. These signals to be transmitter are applied to a modem 16. This modem 16 transmits the control signals via the combiner 20 and via the telephone network to the head end. The selection means 18 are arranged for connecting the output of the modem 16 to the telephone network 21. The combination of the combiner 20 and the selection means 18 constitute the access control means.

If during the transmission of data by the modem 16 the telephone 22 is activated for setting up a telephone call, this is signaled via the selection means 18 to the processor 12. The processor 12 then transmits the current command via the modem 16 and will subsequently terminate the call to the head-end to release the telephone line for the telephone call to be made by means of the telephone 22.

The processor 12 subsequently may transmit a message on the TV receiver informing that certain command can not be issued during the telephone call. Some information such as Impulse Pay per View billing pulses can be temporarily stored in the set-top box 2 until the telephone line becomes available again. The processor also informs the user that certain services are available again when the telephone call has terminated.

The combiner 20 can comprise a switch matrix which can connect the modem 16 or the telephone terminal 22 to the telephone network 21. It comprises also means to determine whether the telephone terminal goes off hook, even if a connection between the modem 16 and the telephone network exists. This detecting can easily be done by applying a current source to the telephone terminal and detecting the voltage across its a–b terminals.

Figure 2:
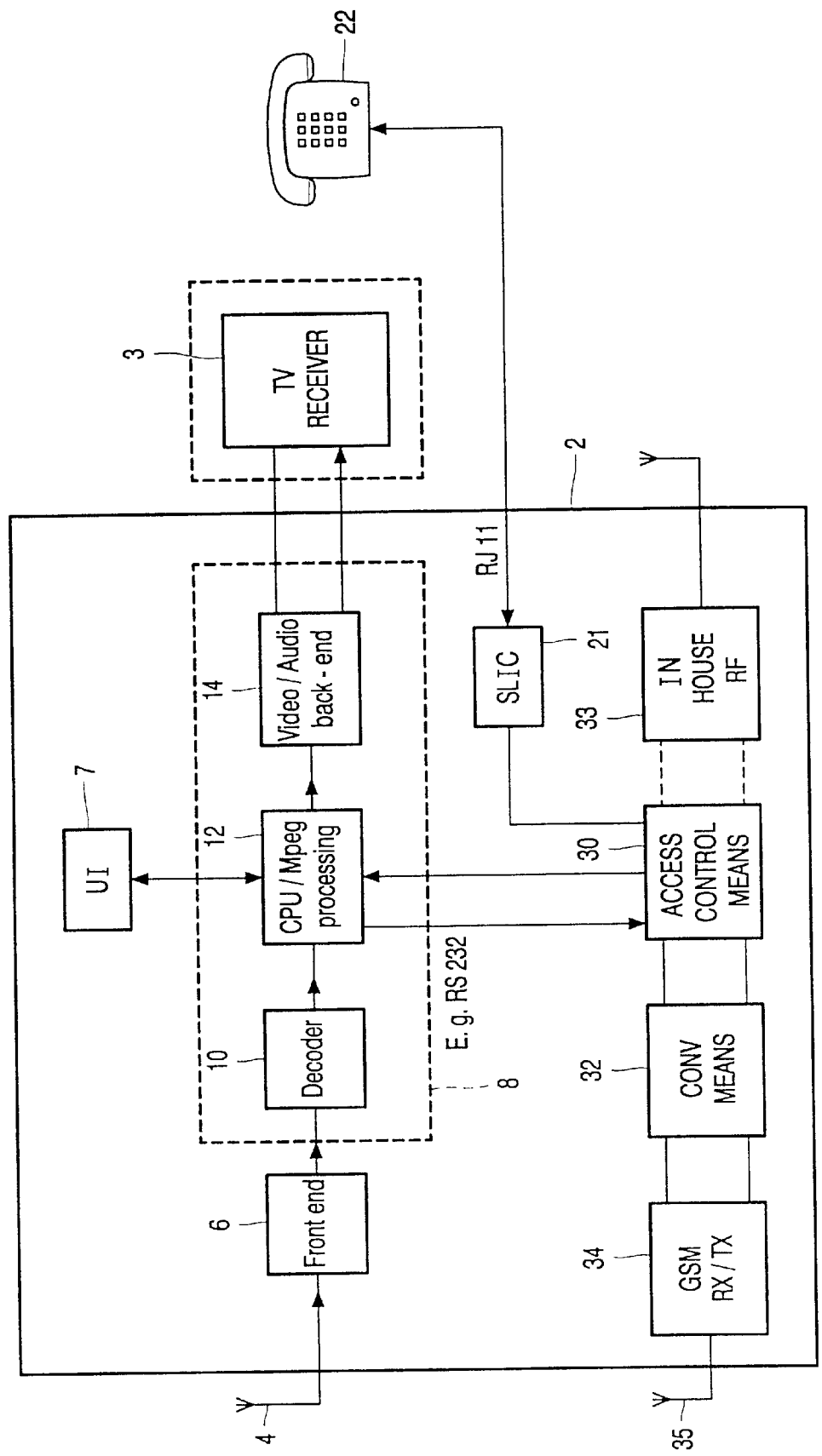
FIG. 2 shows a second embodiment of the invention in which the access control means are integrated in the communication device.

In the communication system according to FIG. 2, a mobile radio network is used instead of the wired telephone network. The telephone terminal 22 is now connected to a subscriber line interface (SLIC) 21. The set-top box therefore comprises a RJ 11 connector for connecting a wired phone. The subscriber line interface 21 is arranged for providing supply power and signaling tones to the telephone terminal 22. It also comprises means for detecting when the phone terminal goes off-hook. The subscriber line interface 21 comprises also an analog to digital converter and a digital to analog converter. The analog to digital converter is arranged for converting the analog signal received from the telephone terminal into a digital signal to be transmitted over the mobile radio network. The digital to analog converter is arranged for converting the digital signal received from the mobile radio network into an analog signal for the telephone terminal 22. Subscriber line interface are common devices readily available on the market as integrated circuits which are well known to those skilled in the art.

The access control means 30 are arranged for making a selection between the control signals from the processor 12 and the signals from/to the subscriber line interface 21. The signals from the access control means 30 are applied to the conversion means 32, which convert these signals into a signal which is suitable for being transmitted over the mobile radio network. The operations performed by the conversion means 32 include assembling frames comprising the signals to be transmitted and adding appropriate headers to it in order to comply with the operating standard of the mobile radio system. This standard can e.g. be GSM. The converted signals at the output of the conversion means are provided to a transceiver 34 which transmits these signal by means of the antenna 35 to the mobile radio network. The antenna 35 is also used for receiving signals from the mobile radio network. These signals can be intended for the processor 12 or for the telephone terminal 22. The transceiver 34 receives the signals from the mobile radio network and presents them to the conversion means 32. The conversion means 32 convert the data provided by the transceiver 34 into a format that is suitable for the device selected by the access control means 30.

It is possible that the communication device 2 further comprises an in house RF unit 32 which is used to control several appliances such as audio systems, VCR's etc. Then the access control means 30 can also be arranged for selecting the in house RF unit 32 as source or destination to be connected to the conversion means 32.

Figure 3:
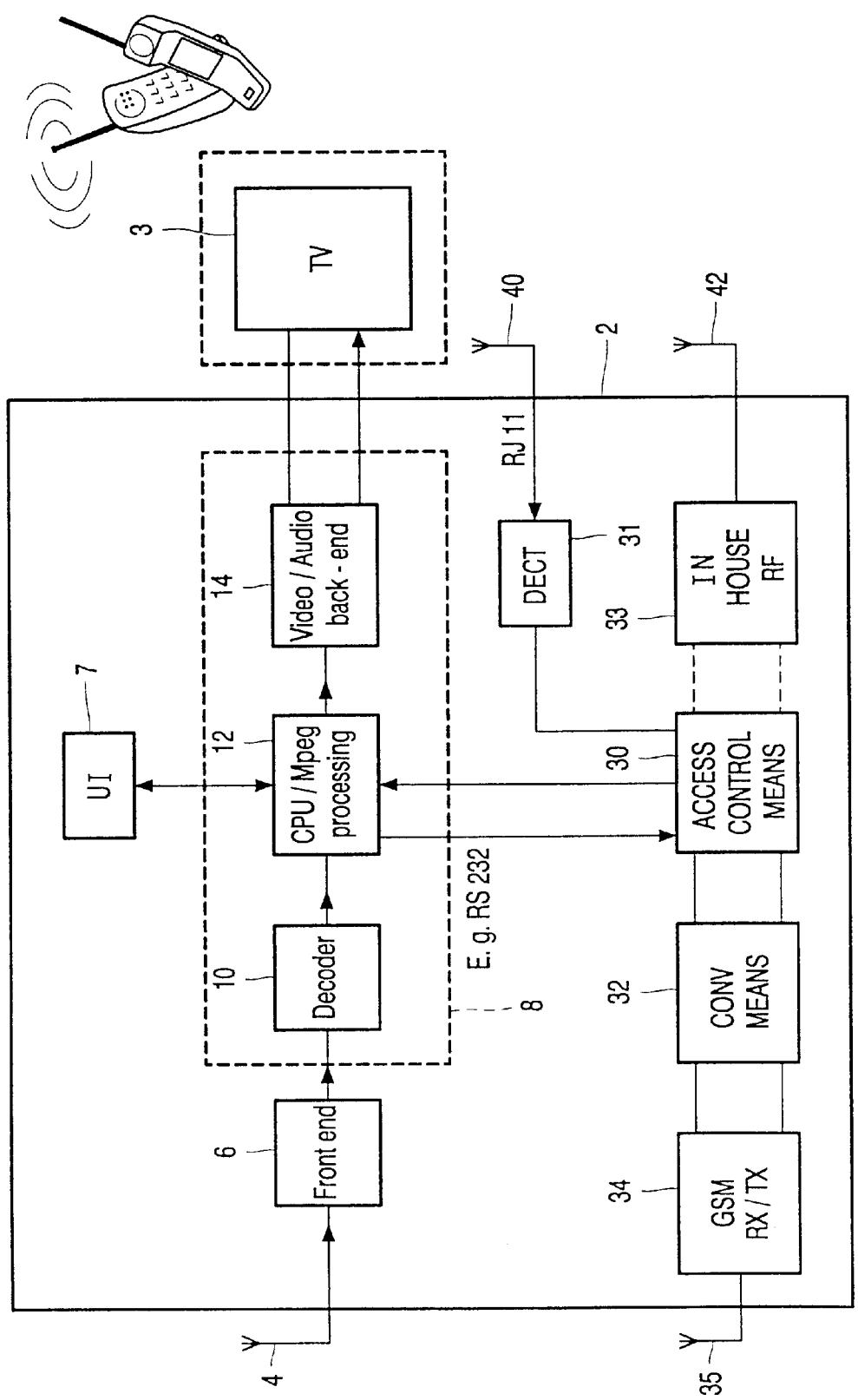
FIG. 3 shows an embodiment of the invention where wireless connections are used.

In the communication system according to FIG. 3, the connections to the telephone terminal 22 are also made wireless. To that end a DECT base station 31 is connected to the access control means 30. The arrangement according to FIG. 3 has a plurality of antennas. These antennas could be combined to a single antenna by using suitable coupling means for coupling the DECT transceiver 31, the in house RF transceiver 42 and the GSM transceiver. These coupling means could be consist of a plurality of bandpass filters for separating the different RF signals. Of course, the frequencies for the DECT transceiver 31, the in-house RF transceiver 33 and the GSM transceiver should then be different.

What is claimed is:

1. A communication system for use with a broadband distribution network and a telephone network comprising:
   at least one telephone terminal; and
   a communication device having a first and second port to enable communication with the broadband distribution network and the telephone network respectively,
   wherein the communication device includes (1) a control signal transmitting means to transmit a control message related to signals received from the broadband distribution network via the telephone network, (2) a conversion means configured to convert telephone signals between the telephone network and the telephone terminal, and (3) an access control means configured to control access to the telephone network by the control signal transmitting means and the at least one telephone terminal.

2. Communication system according to claim 1, characterized in that the at least one telephone terminal comprises a cordless terminal, and in that the communication system comprises a basestation for cordless terminals.

3. Communication system according to claim 1, characterized in that the telephone network is a mobile radio network.

4. Communication system according to claim 1, characterized in that the communication network comprises a TV receiver coupled to the communication device, and in that the TV receiver comprises the at least one telephone terminal.

5. Communication system according to claim 2, characterized in that a TV receiver comprises the communication device.

6. A communication device comprising:
   a first port for receiving signals from a broadband distribution network;
   a second port coupled to a telephone network;
   a processor configured to (1) transmit control messages related to the signals received from the broadband distribution network via the telephone network, (2) control access to the telephone network and at least one telephone terminal and (3) convert telephone signals between the telephone network and the at least one telephone terminal.

7. Communication device according to claim 5, characterized in that the second port comprises an air interface for a mobile radio network.

8. Communication device according to claim 5, characterized in that a third port comprises a connector for a wired telephone terminal.

9. Communication device according to claim 6 that a third port comprises an air interface of a cordless telephone system.

10. Communication device according to one of the claims 4, characterized in that the first second port comprises an air interface for a mobile radio network.

11. TV receiver comprising a communication device according to claim 5.

* * * * *